United States Patent [19]
Yazumi et al.

[11] Patent Number: 6,032,858
[45] Date of Patent: Mar. 7, 2000

[54] ELECTRONIC MONEY STORING APPARATUS AND IC CARD CONTROL METHOD

[75] Inventors: Kazuyuki Yazumi, Owariasahi; Manabu Hayashi, Nagoya; Hitoshi Maekawa, Owariasahi, all of Japan

[73] Assignee: Hitachi, Ltd., Tokyo, Japan

[21] Appl. No.: 08/864,972

[22] Filed: May 29, 1997

[30] Foreign Application Priority Data

May 31, 1996 [JP] Japan ..................................... 8-138109

[51] Int. Cl.[7] .................................................. G06K 17/60
[52] U.S. Cl. .......................... 235/379; 235/486; 902/26; 361/737; 705/17
[58] Field of Search .................................... 235/379, 380, 235/385, 451, 486, 492; 902/26; 361/737, 686, 683; 705/17, 41

[56] References Cited

U.S. PATENT DOCUMENTS

| | | | |
|---|---|---|---|
| Re. 36,116 | 2/1999 | McCarthy | 705/16 |
| 4,673,802 | 6/1987 | Ohmae et al. | 235/379 |
| 4,713,760 | 12/1987 | Yamada et al. | 364/405 |
| 4,736,094 | 4/1988 | Yoshida | 235/379 |
| 4,877,947 | 10/1989 | Mori | 235/381 |
| 5,049,728 | 9/1991 | Rovin | 235/492 |
| 5,461,217 | 10/1995 | Claus | 235/380 |
| 5,506,393 | 4/1996 | Ziarno | 235/375 |
| 5,546,523 | 8/1996 | Gatto | 235/380 |
| 5,621,796 | 4/1997 | Davis et al. | 235/379 |
| 5,659,165 | 8/1997 | Jennings et al. | 235/381 |
| 5,854,581 | 12/1998 | Mori et al. | 235/379 |

FOREIGN PATENT DOCUMENTS 6-19945  1/1994  Japan .

*Primary Examiner*—Michael G. Lee
*Assistant Examiner*—Daniel St. Cyr
*Attorney, Agent, or Firm*—Beall Law Offices

[57] ABSTRACT

In an electronic money storing apparatus in an electronic money transaction system for transmitting and receiving electronic money between electronic money cards holding electronic money, IC cards are loaded to each of a plurality of IC card read/write unit connected to a controller. Each of the IC cards holds electronic money and transmits and receives electronic money with another IC card in the electronic money transaction system. The controller reads and writes the electronic money of the IC cards loaded to a selected IC card read/write unit and transmits and receives the electronic money between that IC card and an electronic money storing media the external of the electronic money storing apparatus.

19 Claims, 12 Drawing Sheets

ELECTRONIC MONEY STORING APPARATUS AND IC CARD CONTROL METHOD

BACKGROUND OF THE INVENTION

1. Field of the Invention

The present invention relates to an electronic money system for settling an account by moving electronic money having the same value as that of currency, and more particularly to an electronic money storing apparatus for storing cards having electronic money stored therein.

2. Description of the Related Art

An electronic money system which exhibits high security against forgery and is capable of conducting an off-line transaction has been recently developed. The electronic money system corresponds to a system in which data of electronic money (electronic having the same value as that of currency) is present on an IC chip in an IC (Integrated Circuit) card (also referred to as an electronic money card) and the electronic money is moved between electronic money cards to settle the accounts. Such system is disclosed in JP-A-6-19945.

In such system, a terminal device for receiving and handling an electronic money card which a general user possesses, and a partner device for receiving the electronic money data and paying it which corresponds to an autoteller terminal device in a financial organization or a cash storing box such as a cash register in a retail store system are required. Further, since the transaction is made between IC cards in this system, the IC card of the financial organization or the retail store system as well as the IC card of the user are occupied during the transaction process of the electronic money data. Accordingly, in order to conduct the transactions with a plurality of users concurrently, it is necessary that the financial organization or the retail store system possesses and control a plurality of IC cards, and this has been attained by providing a plurality of PCs (Personal Computers) connected to an ICRW (IC Reader/Writer) for reading and writing the IC card.

SUMMERY OF THE INVENTION

In the prior art system described above, since a plurality of PCs for controlling a plurality of IC cards are needed, cost increases and a large installation space is required. Further, when a number of users access the PCs of the financial organization at one time, it is difficult to control the PCs.

Further, since the IC card in this system has the same economical value as that of cash currency, it is necessary to protect the IC card from crime such as destruction or theft by an unauthorized act of a person who handles the IC cards or a suspicious person, or natural disaster such as earthquake or fire. However, no such consideration has been taken on this point.

It is an object of the present invention to provide a low cost and small size electronic money storing apparatus in such an electronic money system which stores and controls a plurality of IC cards.

It is another object of the present invention to provide an electronic money storing apparatus which can protect the IC card from crimes such as unauthorized acts and natural disasters such as earthquakes and fires.

In order to achieve the above objects, in accordance with the present invention, one controller controls a plurality of ICRWs and to transact electronic money data between the IC card mounted on a selected ICRW and another IC card.

Further, changes in environment information of the apparatus installation are detected by various sensors to stop the transaction of the electronic money data.

DESCRIPTION OF THE PREFERRED EMBODIMENTS

Figure 1:
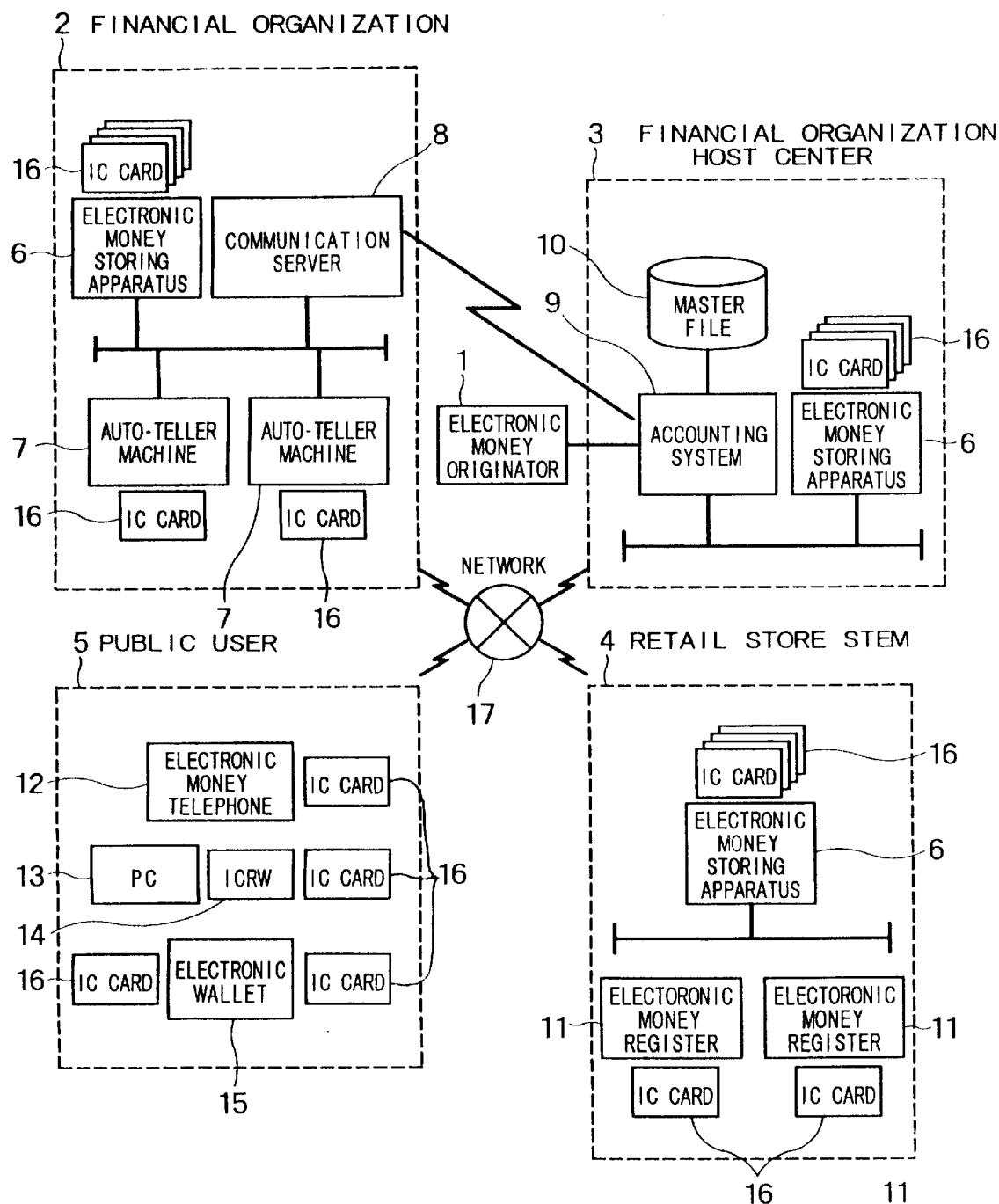
FIG. 1 shows a schematic view of an electronic money system in accordance with the present invention.

FIG. 1 shows a system schematic financial organization of an electronic money system to which an electronic money storing apparatus of the present invention is applied. FIG. 1 and other subsequent drawings illustrate one electronic money system of the present invention and they do not restrict the construction and functions of the present invention.

The electronic money system is provided with the same assignability and anonymity as those of cash and settles the accounts by holding electronic money data in an IC chip in an electronic money card (IC card) and moves the electronic money from IC card to IC card in order to maintain high security against alteration and forgery.

FIG. 1 shows a schematic financial organization of the electronic money system, in which block 1 denotes an electronic money originator, block 2 denotes a financial organization such as a bank, block 3 denotes a host center of the financial organization, block 4 denotes a retail store system such as a department store and block 5 denotes a general user. The electronic money may be transacted either between blocks or in one block. Numeral 16 denotes an electronic money storing apparatus for controlling and storing a plurality of IC cards, numeral 7 denotes an auto-teller machine (also simply referred to as an ATM), numeral 8 denotes a communication server for conducting communication with an accounting system in a host, numeral 9 denotes an accounting system, numeral 10 denotes a master file for storing cash flow, numeral 11 denotes an electronic money register for handling the electronic money, numeral 12 denotes an electronic money telephone by which the electronic money may be transacted through a telephone line, numeral 13 denotes a PC (personal computer), numeral 14 denotes an ICRW for reading and writing the electronic money card (IC card), numeral 15 denotes an electronic money wallet by which the transaction of the electronic money may be conducted between individual users, numeral 16 denotes the electronic money card (IC card), and numeral 17 denotes a network for connecting the respective blocks.

Referring to FIG. 1, an example of transaction of the electronic money is explained.

First, the electronic money originator 1 issues to the financial organization host center 3 the electronic money of the same amount as that of cash in exchange of the cash. The financial organization host center 3 distributes the electronic money to the financial organization 2 to make it ready for an electronic money transaction request from the retail store system 4 and the general user 5. This corresponds to the preparation of bills and coins necessary for the transaction in a safety box or the auto-teller terminal 7 when cash is transacted.

Next, as an example of distribution of the electronic money in market, an example of transaction in which the general user 5 takes back the electronic money from the auto-teller machine 7 of the financial organization 2 is explained. First, the general user 5 inserts the IC card 16 into the auto-teller machine 7 and identifies the person by entering a password. When the personal identification and the balance of the deposit are confirmed by the accounting system 9 and the master file 10, the takeout of the deposit balance is permitted. When the user selects the withdrawal by the electronic money, the electronic money data for the designated withdrawal amount is moved from the electronic money storing apparatus 6 of the financial organization 2 to the IC card 16 of the user. At this time, the deposit balance of the user and the electronic money balance of the electronic money storing apparatus 6 of the financial organization 2 on the master file 10 are decreased by the amount of withdrawal and the transaction is completed.

Then, when the user 5 pays the price of purchased goods by the electronic money, the user 5 inserts the IC card 16 having the electronic money balance into the electronic money register 11 to present invention the price as the price of the purchased goods. The electronic money data for the price of the purchased goods is moved from the IC card 16 of the user to the electronic money storing apparatus 6 of the retail store system 4, the electronic money balance in the IC card 16 of the user is decreased by the amount of the price of the purchased goods, and the electronic money balance of the electronic money storing apparatus 6 of the retail store system 4 is increased by the amount of the price of the purchased goods, and the transaction is completed. In this transaction, the communication for the personal identification and the balance check with the financial organization 2 is not conducted and it is completed in the retail store system 4 as an off-line transaction. The retail store system 4 may transmit the electronic money data which it possesses in the electronic money storing apparatus 6 to the financial organization 2 through the network 17 at any timing. Further, the user may take out the electronic money through the network 17 by using the electronic money telephone 12 and the PC 13 or exchange the electronic money data between users by using the electronic money wallet 15.

In order to move the electronic money from IC card to IC card, several of data transmission for the determination of truth or falsehood of the partner IC card, the settings of receipt and payment and the amount of money movement are required and the communication with other IC card cannot be conducted in parallel during that period. Thus, the pair of IC cards are occupied until the transaction is completed. Thus, in the financial organization, it is necessary to possesses and control a plurality of IC cards in order to conduct concurrent transaction with a plurality of users.

Further, it is necessary for the electronic money storing apparatus which stores and controls the IC card having the same economical value as that of cash currency to protect the IC card from the crimes such as unauthorized acts, breaking and theft and the natural disasters such as earthquakes and fires.

Figure 2:
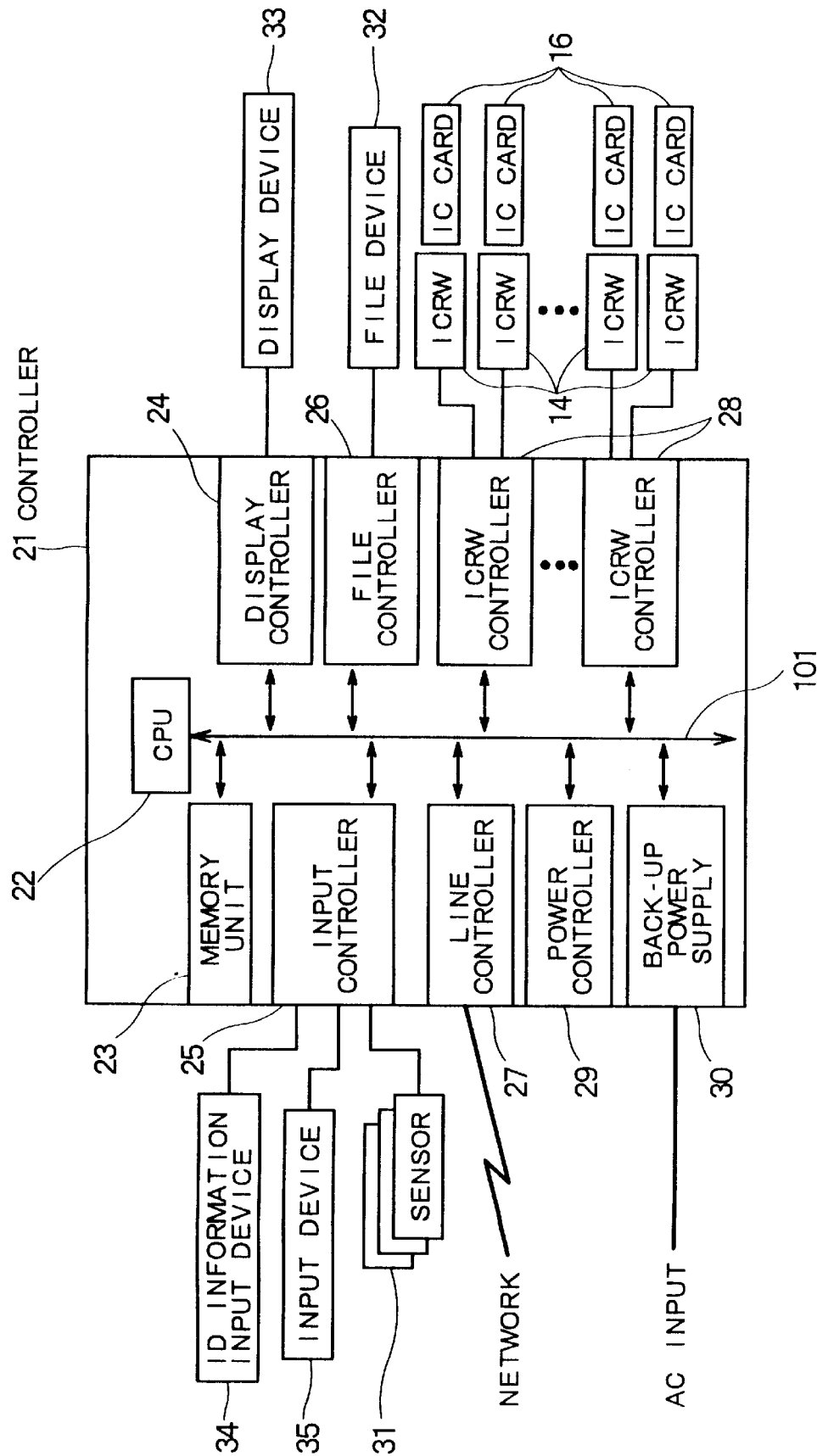
FIG. 2 shows an internal block diagram of an electronic money storing apparatus 6 shown in FIG. 1.

FIG. 2 shows a block diagram of the electronic money storing apparatus 6 of FIG. 1. As shown in the block shown previously, the electronic money storing apparatus 6 is installed primarily in the blocks 2, 3 and 4 of the managing system.

Numeral 21 denotes a controller for controlling units in the electronic money storing apparatus 6, numeral 22 denotes a CPU of the controller 21, numeral 23 denotes a memory unit for storing transaction data of the electronic money, numeral 24 denotes a display controller for controlling output display from the electronic money storing apparatus 6, numeral 25 denotes an input controller for controlling data inputted to the electronic money storing apparatus 6, numeral 26 denotes a file controller for controlling various files, numeral 27 denotes a line controller for controlling the communication with an external terminal (for example, the auto-teller machine 7 of FIG. 1), numeral 28 denotes an a controller for controlling the electronic money card (IC card) 16 through the ICRW 14 by a command from the controller 21, numeral 29 denotes a power controller for controlling the ON/OFF of a power supply of the electronic money storing apparatus 6, and numeral 30 denotes a back-up power supply for supplying back-up power in case of power failure.

The electronic money storing apparatus 6 is further provided with sensors 31 for detecting temperature and vibration, a file device 32 for maintaining a transaction record file, a display device 33 for displaying alarm during the operation and a massage such as a command to exchange the IC card, an ID information input device 34 for reading operator ID information when the IC card is exchanged, and an input device 35 used to input a password when the IC card is exchanged and for maintenance operation. The memory unit 23 and the file device 32 may also be collectively referred to as a memory.

As shown in FIG. 2, a plurality of ICRW controllers 28 are provided and several ICRWs 14 are connected to each of the ICRW controllers 28. Although electronic money ICRWs 14 shown may be connected to one ICRW controller 28.

Figure 3:
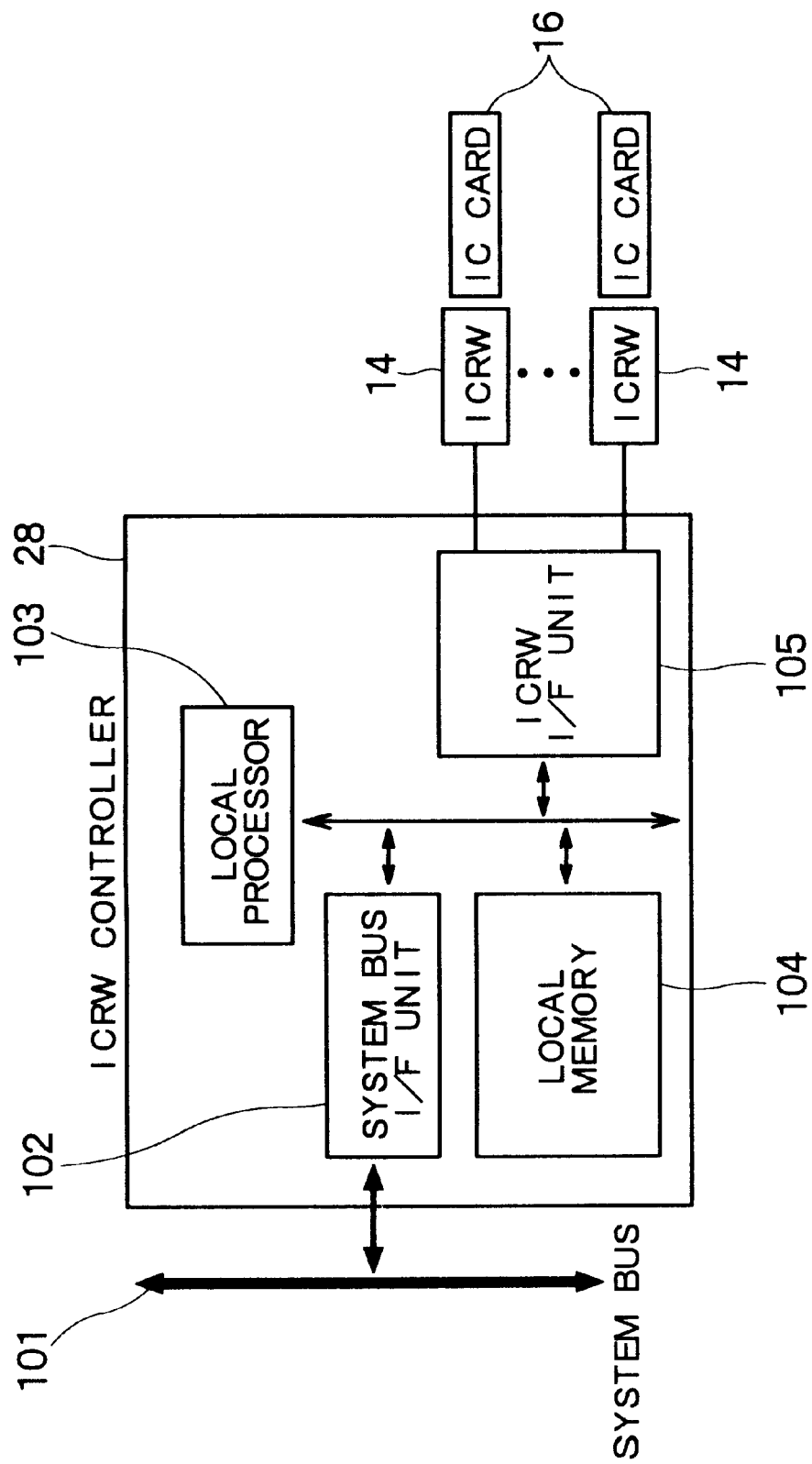
FIG. 3 shows an internal block diagram of an ICRW controller 28 shown in FIG. 2.

FIG. 3 shows a block diagram of the ICRW controller 28 shown in FIG. 2.

It comprises a system bus interface unit 102 connected to a system bus 101, a local processor (hereinafter referred to as an LP), a local memory 104 and a plurality of ICRW interface units 105, and controls a plurality of ICRWs 14 connected to the ICRW controller 28.

Figure 4:
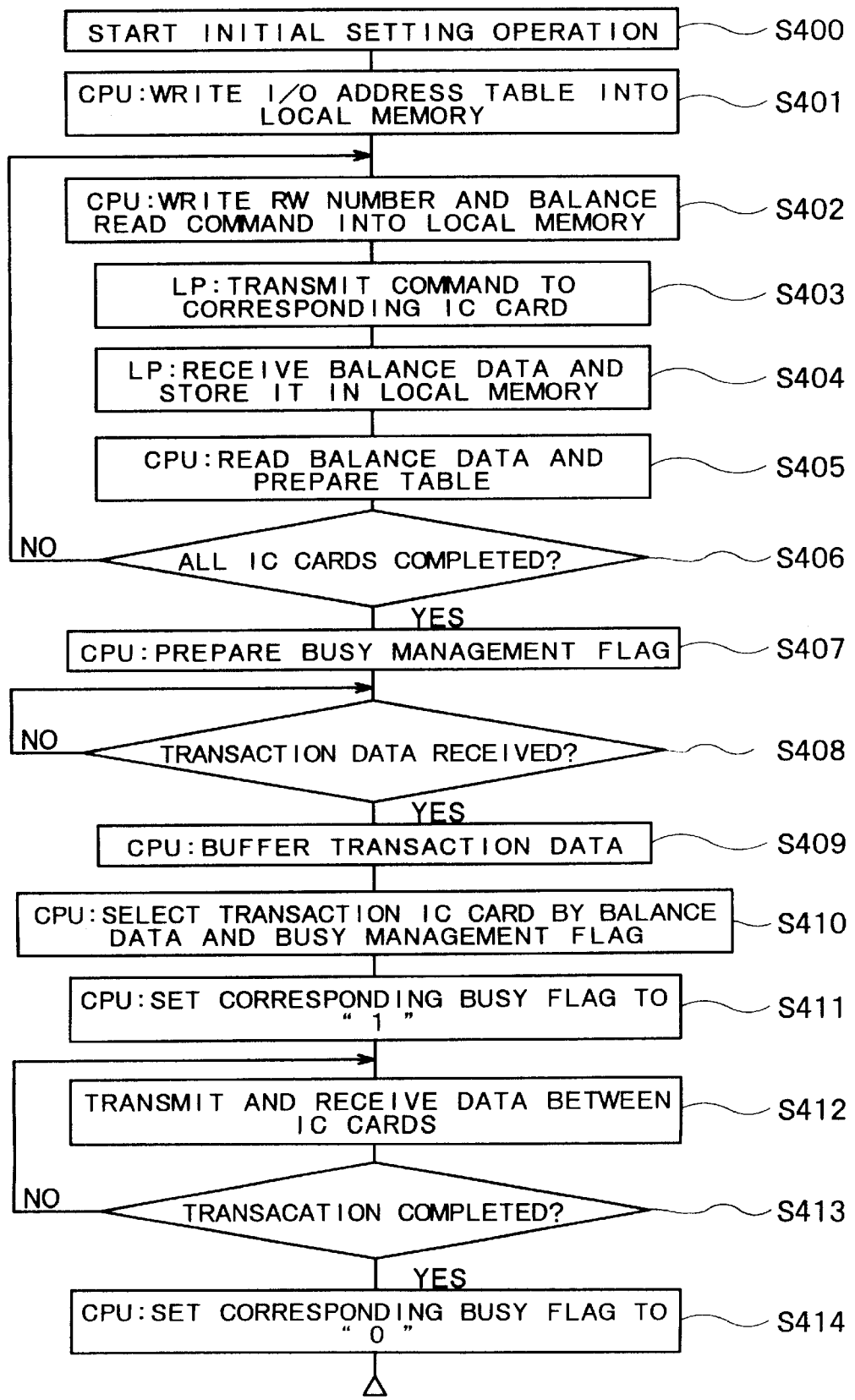
FIG. 4 shows a flow of an transaction operation of the electronic money storing apparatus 6.

FIG. 4 shows a flow chart of a transaction operation by the electronic money storing apparatus 6 constructed as shown in FIGS. 2 and 4. Here, by way of example, an operation of when the electronic money is deposited to the electronic money storing apparatus 6 from an external IC card other than the electronic money storing apparatus 6 through the network is described. It should be understood that the electronic money data may be moved between the electronic money cards 16 in the electronic money storing apparatus 6 (as it is in a construction to be described later) although the explanation thereof is omitted.

As an initial operation (step 400) at the power-on of the electronic money storing apparatus 6, an I/O address table comprising individual retail store system numbers assigned to the respective ICRWs 14 and I/O addresses is written into a local memory 104 in the ICRW controller 28 shown in FIG. 3 from the memory unit 23 of the controller 21 shown in FIG. 2 through the system bus 101 and the system interface unit 102 (step 401). The retail store system numbers on the I/O address table indicate the numbers of the respective ICRWs 14 shown in FIG. 3 and as many retail store system numbers in the I/O address table as the number of ICRWs 14 are assigned thereto like "00", "01", "02" in the order of top to bottom, and the I/O addresses in the I/O address table are assigned with addresses corresponding to the retail store system numbers, for example, "FF00~FF0F", "FF10~FF1F", "FF20~FF2F".

Then, the CPU 22 reads the electronic money balance in the IC card 16 loaded to each of the ICRWs 14 to prepare a balance table in the memory unit 23. A configuration for preparing the balance table is first explained below.

The CPU 22 writes the retail store system number of the ICRW 14 to be accessed an IC card command, for example, "Read the electronic money balance in the card and return it as response data" stored in the memory unit 23 into a predetermined area of the local memory 104 from the system bus through the system bus IF unit 102 (step 402). In response thereto, the LP 103 refers the I/O address table from the retail store system number written into the local memory 104 to recognize the I/O address assigned for the control of the corresponding ICRW 14, and transmits the IC card command to that address (step 403).

The IC card 16 receives the IC card command through the ICRW 14 and receives the electronic money balance as response data from the IC card 16 through the ICRW 14 in order to transmit the electronic money balance in the IC chip to the local memory 104 as response data in accordance with the content of the command (step 404).

The CPU 22 reads the retail store system number and the electronic money balance corresponding to that retail store system number from the local memory 104 (step 405), conducts a read process of the electronic money balance for electronic money IC cards 16 stored in the electronic money storing apparatus 6 (step 406) and prepares in the memory unit 23 a balance table which indicates the electronic money balances of the respective IC card 16 in the electronic money storing apparatus 6. The balance table is updated to the setting of the latest balance for each transaction of each IC card 16.

Then, it is necessary to determine whether each ICRW 14 is in the process of transaction or not because when the transaction is made for one IC card 16, that IC card cannot be accessed by others. Thus, an ICRW busy management flag is prepared in the memory unit 23 (step 407).As the ICRW busy management flag, as many bits as the number of sets of ICRWs provided in the electronic money storing apparatus 6 are secured in the memory unit 23, and the ICRW busy management flag is set to "1" during the period from the start of transaction by each ICRW 14 to the completion thereof, and set to "0" during other non-transaction period.

As described above, as the initial setting of the electronic money storing apparatus 6, the electronic money balance and the ICRW busy management flag indicating whether it is in the process of transaction or not in each card are linked and prepared in the memory unit 23 for each of the electronic money cards stored in the electronic money storing apparatus 6 (as it is for the retail store system numbers) in order to facilitate the management of the cards as will be described later.

When data relating to the receipt transaction from an external IC card other than the electronic money storing apparatus 6 is received through the network 17 or the line control unit 27 (step 408), the data is buffered in the memory unit 23 (step 409) and the electronic money card (IC card) 16 in the electronic money storing apparatus 6 to be transacted is selected. As an example of the selection procedure of the IC card 16, it is assumed here that the receipt is made to the IC cards, starting from the smallest balance IC card among the IC cards 16 not being transacted, in the ascending order.

The CPU 22 refers the ICRW busy management flag and the balance table to recognize the retail store system number of the IC card 16 which is not being transacted (the setting of the ICRW busy management flag is "0") and has the smallest balance and selects it as a transaction partner (step 410). Namely, it outputs a signal indicating grant for the access request.

After the selection, "1" indicating that it is in the process of transaction is set to the corresponding bit of the ICRW busy management flag (step 411). Subsequently, the command stored in the memory unit in association with the retail store system number and the transaction data from the IC card externally of the apparatus are transmitted and received for the IC card 16 to conduct the desired reception transaction as they are done for the preparation of the balance table (step 412).

After the completion of the transaction (step 413), the corresponding bit of the ICRW busy management flag is reset to "0" (step 414) and the balance data of the corresponding IC card 16 in the balance table, that is, the IC card 16 selected for the transaction is updated to the balance data after the transaction. In updating the balance data, it is necessary for the CPU 22 to analyze the transaction amount based on the content of the transaction data in the method for adding the money amount of the received electronic money to the balance table. Thus, the command to read the electronic money is reissued to the IC card selected for the transaction to read the balance data after the transaction to update the balance table as they are in the preparation of the balance table described above.

Since the electronic money data transmitted and received between IC cards 16 is buffered in the local memory 104, namely, it is temporarily saved, access by another IC card is permitted even if one IC card is occupied for the transaction and a plurality of transactions may be processed in parallel by one electronic money storing apparatus 6.

In this manner, since a plurality of IC card storing apparatus 14 and IC cards 16 may be controlled by the controller 21 of the electronic money storing apparatus 6 of the present invention through the IC card controller 28, the electronic money storing apparatus which can process in parallel a plurality of transactions with a low cost and a small space may be attained.

Figure 5:
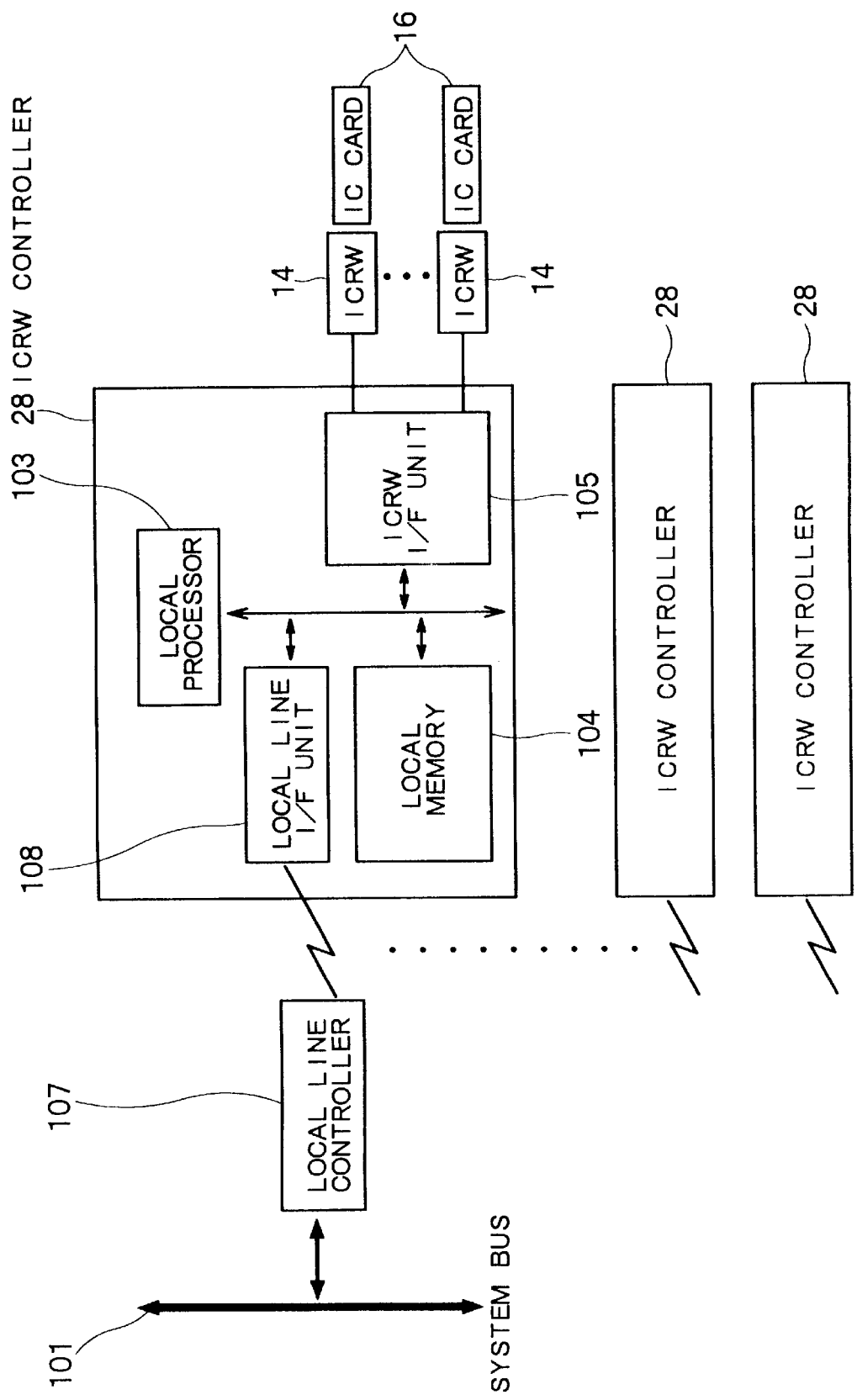
FIG. 5 shows an internal block diagram of another electronic money storing apparatus having the ICRW controller 28 shown in FIG. 2.

FIG. 5 shows a configuration of other ICRW in which the ICRW controller 28 described in connection with FIG. 3 is modified. As shown, the local line controller 107 for controlling a serial line is connected to the system bus 101 and the local line interface unit 108 connected to the local line controller 107 is mounted in the ICRW controller 28, and the electronic money transaction as explained in connection with FIG. 4 is conducted. In this case, since only the local line controller 107 is directly connected to the system bus 101, the I/O addresses in the electronic money storing apparatus 6 and the occupation of the interrupt channel may be small and a greater number of ICRW than that described in connection with FIG. 3 may be flexibly connected.

Figure 6:
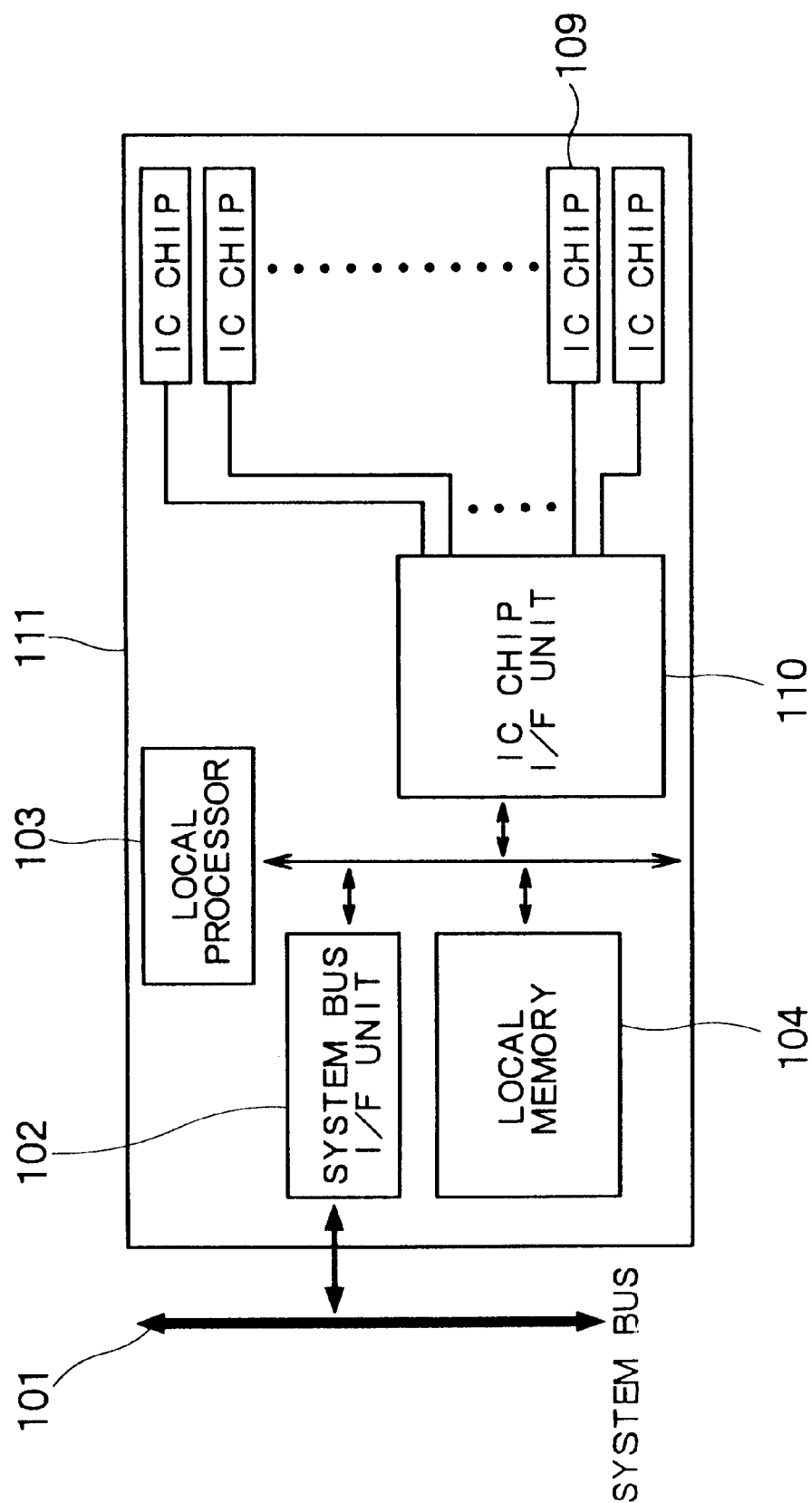
FIG. 6 shows an internal block diagram of an IC chip controller when an IC chip is used in place of an IC card 16 shown in FIG. 3.

FIG. 6 shows a configuration of other ICRW in which the IC card 16 explained in connection with FIG. 3 or 5 is modified. As shown in FIG. 6, instead of the IC card 16, the ICRW 14 and the ICRW interface unit 105 shown in FIG. 3 or 5, the IC chip 109 for storing the electronic money data and the IC chip controller 111 having the IC chip interface unit 110 connected to the IC chip 109, mounted thereon are packaged in the controller 21 shown in FIG. 2. In this case, since the ICRW controller 28, the ICRW 14 and the IC card 16 as the medium are not necessary, the price and the space may be further reduced.

Figure 7:
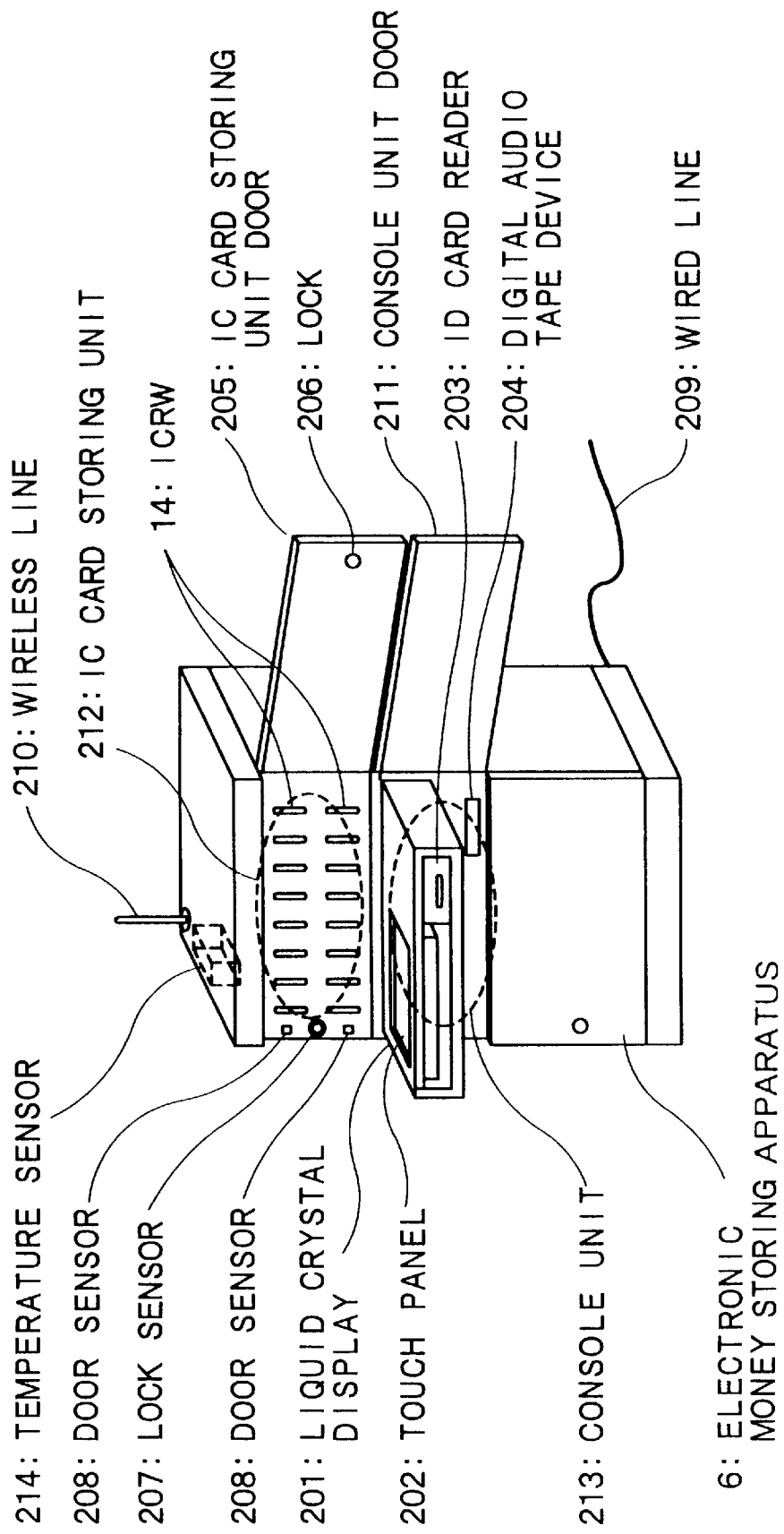
FIG. 7 shows an external views of one of the electronic money storing apparatus 6.

FIG. 7 shows an external financial organization of the electronic money storing apparatus 6 described above. The card explained in connection with FIG. 3 or 5 is adopted as the medium for storing the electronic money and the example of the IC chip explained in connection with FIG. 6 is omitted.

As shown in FIG. 7, the electronic money storing apparatus 6 comprises an IC card storing unit 212 arranged at the top of the apparatus and ICRW console unit 213 arranged in a middle stage of the apparatus, and the IC card storing unit 213 may store a plurality of electronic money cards (IC cards) 16 and an operator may conduct a desired operation through the console unit 213. Since the IC card storing unit is arranged at the top of the apparatus, the operator may readily take out the electronic money card, and since the console unit 213 is arranged in the middle stage of the apparatus, the electronic money storing apparatus which is easy to handle is provided. By integrating those units as shown, the required space is reduced and the control of the desired transaction process is simplified.

The console unit 213 comprises a liquid crystal display 201 for displaying guidance when the operator operates the apparatus, a touch panel for entering data during the operation, an ID card reader for reading an ID card inserted by the operator to identify the operator, and a digital audio tape device 204 for backing up the storage content of the file device of FIG. 1. The liquid crystal display 201 corresponds to the display device 23 shown in FIG. 1, the ID card reader 203 corresponds to the ID information input device 34, and the touch panel 202 corresponds to the input device 35. The IC card storing unit 212 has an IC card storing unit door 205 to prevent the stored IC card from being exposed to the external of the apparatus, and the IC card storing unit door 205 has a lock 206 for locking the door. A lock sensor 207 for detecting whether the lock 206 is locked or not and a door sensor 208 for detecting whether the IC card storing unit door 205 is closed or not are provided.

Further, in FIG. 7, numeral 209 denotes a wired line connected to the network 7 of FIG. 1, numeral 210 denotes a wireless line controlled by the line controller 27, and numeral 214 denotes a temperature sensor which is one of the sensors 31. Names of the components in FIG. 7 are examples of components to implement the present invention, and the liquid crystal display 201 may be a CRT display or a 7-segment LED, the touch panel 202 may be a keyboard, and the ID card reader 203 may be an IC card reader or a fingerprint collator.

FIG. 7 shows a status in which the console unit 213 including the liquid crystal display 201, the touch panel 202 and the ID card reader 203 is removed. When it is not used, the console unit 213 is accommodated in the electronic money storing apparatus 6. The console unit door 211 which covers the console unit 212 may be omitted.

Sixteen ICRWs 14 are provided in the electronic money storing apparatus 6 and the electronic money card (IC card) 16 may be loaded into each slot. The IC cards 16 may be loaded to electronic money of the sixteen ICRWs 14 or as many IC cards 16 as required may be loaded. In the IC card storing unit 212 in which the IC cards are loaded, the IC card storing unit door 205 is locked by the lock 206, and the console unit 213 including the liquid crystal display 201, the touch panel 202 and the ID card reader 203 is provided with the separate console unit door 211.

It is necessary to open the IC card storing unit door 205 in order to remove the IC card 16. The security for the prevention of crimes is enhanced by constructing such that the door is not opened unless the ID card possessed by the operator is set to the ID card reader 203 of the console unit 213. Detail of the control of the prevention of crimes will be described later in conjunction with FIG. 10.

An operation when the power is shut down is explained. When the power supplied to the electronic money storing apparatus 6 is shut down, the IC card storing unit door 205 cannot be opened by the control of the controller 21. This may be attained by using an electromagnetic solenoid and a spring. Namely, when the power is shut down, the spring extrudes to press the IC card storing unit door 205 to prevent it from being opened, and when the power is turned on, the electromagnetic lock 215 is retracted to release the IC card storing unit door 205. In this manner, the structurally same electromagnetic lock 215 is used for the shut-off of the power and the prevention of crimes for the door 205. Further, the electromagnetic lock 215 is also provided in the IC card insertion slot of each of the ICRWs 14 of the IC card storing unit 212 storing apparatus that the removal of the IC card 16 may be prevented even when the IC card storing unit door 205 is open.

Since a large amount of electronic money which is equivalent to the currency is stored in the electronic money card (IC card), when the IC card is to be removed from the IC card storing unit 212, the electronic money storing apparatus 6 checks whether the electronic money balance of the IC card to be removed is zero or not to further enhance the security for the protection of crimes. Detail of this control will be explained later in conjunction with FIG. 11.

Figure 9:
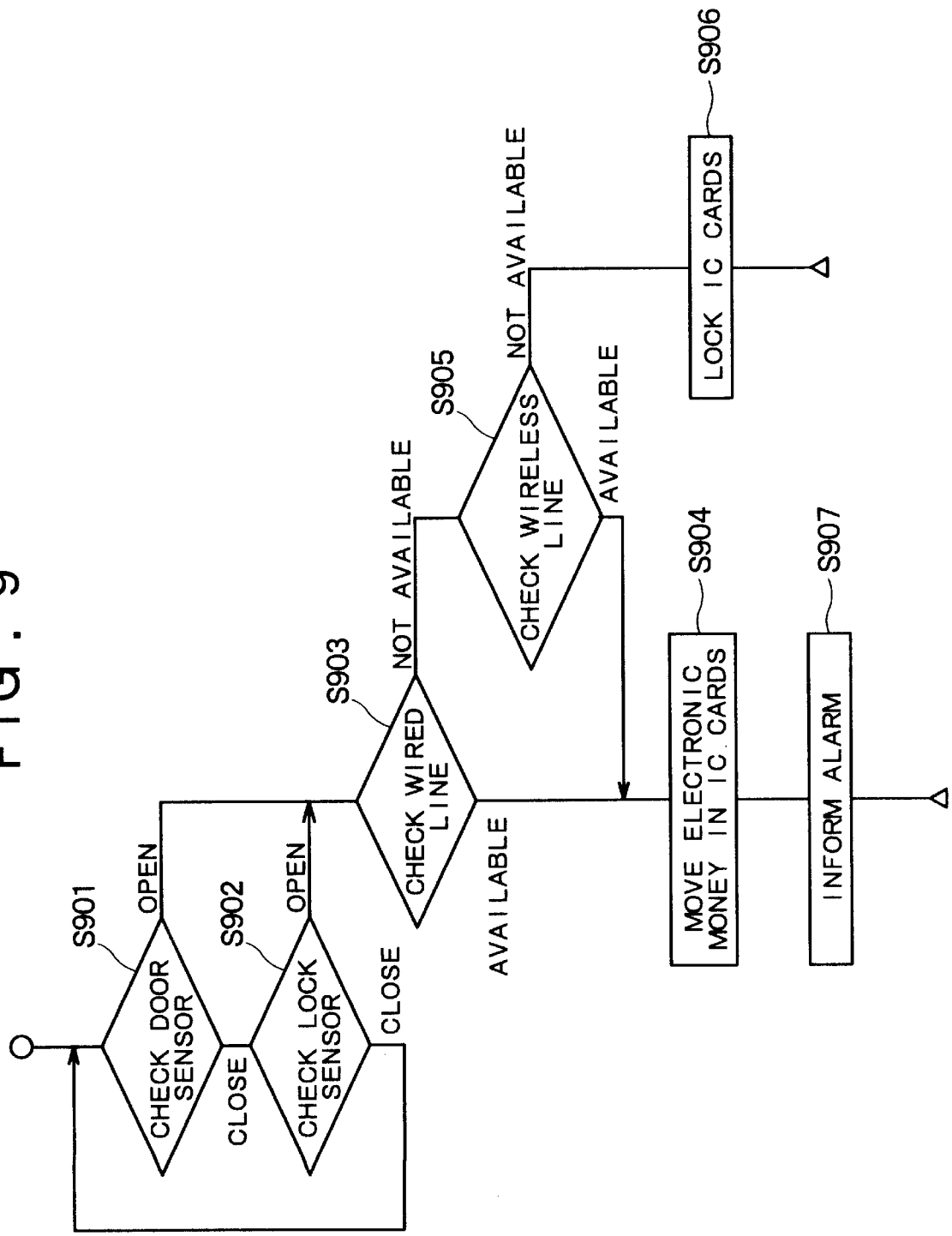
FIG. 9 shows a flow chart of a process when the IC card storing unit door 205 shown in FIG. 7 is broken open in an unauthorized manner.

FIG. 9 shows an example when an abnormal operation is applied to the electronic money storing apparatus 6 in accordance with one embodiment of the present invention, and shows a flow of process of the control unit 21 when the IC card storing unit door 205 is opened in an unauthorized manner. A normal door opening operation using the operator ID card or the password input will be explained later.

During the normal operation of the electronic money storing apparatus 6, the door sensor 208 and the lock sensor 207 monitor the status of the IC card storing unit door 205. When the door is opened by the criminal act of a third person while the opening of the IC card storing unit door 205 is not permitted, the lock sensor 207 and the door sensor 208 detect the opening of the IC card storing unit door 205 (steps 901 and 902). Thereafter, the controller 21 of FIG. 2 checks whether the communication with the external other than the electronic money storing apparatus 6 through the wired line 209 is permitted or not (step 903), and if it is permitted, it moves the electronic money data of the IC card 16 in the electronic money storing apparatus 6 to which the criminal act is to be done, through the wired line 209 as it is when the electronic money is moved in the previous case. Specifically, the electronic money of the electronic money storing apparatus 6 of the financial organization 4 of FIG. 1 is moved to the IC card 16 in the electronic money storing apparatus 6 (step 904).

When the communication through the wired line 209 is not permitted in the wired line check of the step 903, whether the communication through the wireless line 210 shown in FIG. 7 is permitted or not is checked (step 905), and if it is permitted, the electronic money data is moved through the wired line 210 (step 904). In this manner, if the communication through either one of the wired line 209 and the wireless line 210 is permitted, the electronic money is moved from the electronic money storing apparatus 6 to which the criminal act is to be done to other storing apparatus 6 and alarm is informed to a management terminal, not shown, connected to the network (step 907) to indicate that the criminal act is being done.

When the movement of the electronic money data succeeds, even if the IC card 16 is taken away thereafter, the damage is only the loss of the physical IC card 16 because the electronic money data itself is present in the electronic money storing apparatus 6 in the financial organization 2.

When both the communications by the wired line 209 and the wireless line 210 are not permitted, the IC card 16 in the electronic money storing apparatus 6 is set to an electronic locked state to inhibit the movement of the electronic money data (step 906), or the electronic money data itself is deleted. In this case, when the IC card 16 is taken away, the electronic money data itself is lost but the consumption of the electronic money data by the criminal can be prevented.

Referring to FIG. 7, the control when an abnormal event such as disaster occurs for the electronic money storing apparatus 6 is explained. A temperature sensor 214 of FIG. 7 corresponds to the sensor 31 in FIG. 2. The temperature sensor 214 is arranged at the position shown in FIG. 7 although the position of the arrangement and the number of sensors are not restrictive.

When the disaster such as fire occurs or the electronic money storing apparatus 6 is heated by a burner for theft purpose, the abnormal state is detected by the temperature sensor 214 and the controller 21 checks whether the communication with the external through the wired line 209 is permitted or not (like the step 903) in the same manner as that when the IC card storing unit door 205 is opened as explained in conjunction with FIG. 9, and if it is permitted, the electronic money data of the IC card 16 in the electronic money storing apparatus 6 is moved to the electronic money storing medium such as other electronic money storing apparatus 6 through the wired line 209 (like the step 904) and alarm is informed to the management terminal, not shown (like the step 907). If the communication through the wired line 209 is not permitted because of the criminal act or others, whether the communication through the wireless line 210 is permitted or not is checked (like the step 905), and if it is permitted, the electronic money data is moved to other electronic money storing medium through the wireless line 210 and the alarm is informed (like the steps 904 and 907). When both the communications through the wired line 209 and the wireless line 210 are not permitted, the electronic money data of the IC card 16 in the electronic money storing apparatus 6 is set to the electronic locked state to prevent the movement of the electronic money data (like the step 906).

Environment information detected depending on the form of the disaster or crimes may be vibration, shock, electromagnetic wave or water, and the sensors 10 shown in FIG. 2 detect those states and process them in the same manner as that of the temperature sensor 214.

As described above, the electronic money storing apparatus 6 offers high security by providing crime prevention facilities in the IC card storing unit 212, the console unit 213 or the entire electronic money storing apparatus 6.

There is no assurance that the power is being supplied to the electronic money storing apparatus 6 even if the detection signals of the sensor 31 and the lock sensor 207 are inputted to the controller 21 in the case of disaster or criminal act. Thus, the apparatus is driven by the back-up power supply 30 shown in FIG. 2 to electronic money the movement of the electronic money data to other electronic money storing apparatus as described above. Namely, when the power is not supplied by the power failure, the back-up power supply 30, as a spare power supply, drives the electronic money storing apparatus 6 and when the voltage of the back-up power supply drops to a predetermined voltage, the apparatus is turned off. Further, when the power failure lasts for a predetermined period, the electronic money data is moved to the electronic money storing medium such as predetermined other electronic money storing apparatus storing apparatus that the security is further enhanced.

Figure 10:
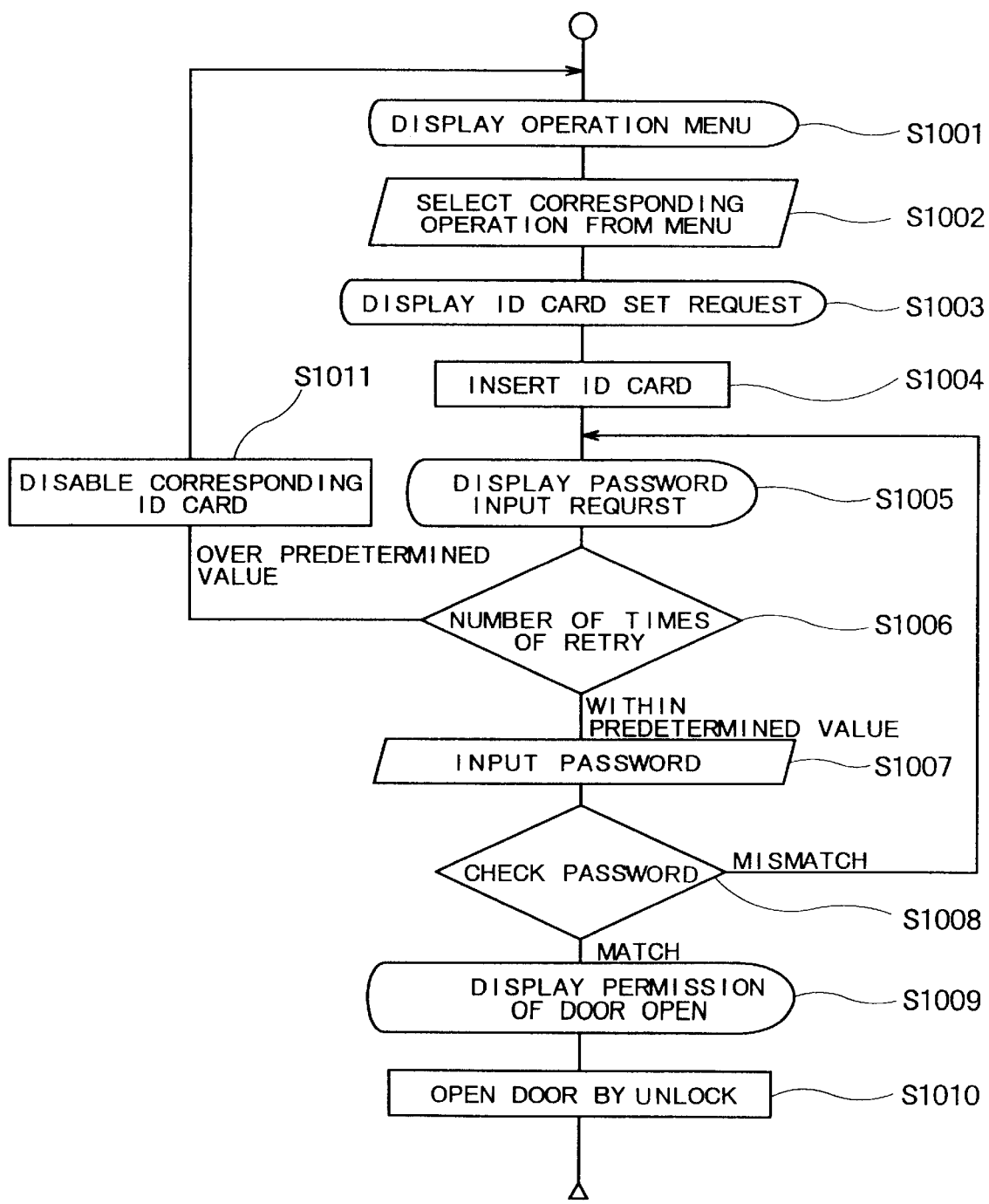
FIG. 10 shows a flow chart of a process when the IC card storing unit door 205 shown in FIG. 7 is opened.

FIG. 10 shows a flow of a process when the IC card storing unit 205 shown in FIG. 7 is opened in a normal manner.

Figure 8:
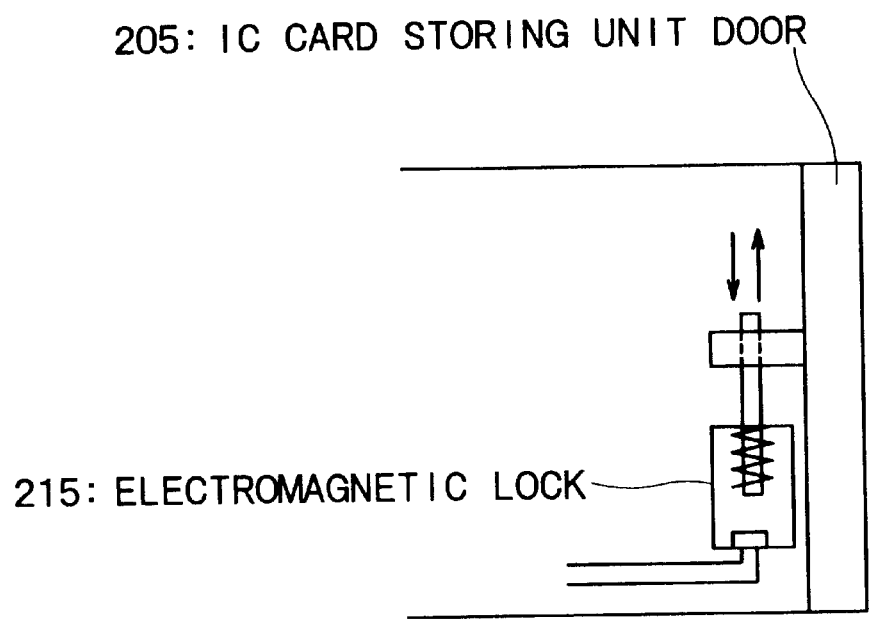
FIG. 8 shows a schematic financial organization of a lock system of an IC card storing unit door 205 shown in FIG. 7.

First, the door open is selected from the operation menu displayed on the liquid crystal display 201 through the touch panel 202 (steps 1001 and 1002). Then, the controller 21 displays a message requesting the insertion of the operator ID card on the liquid crystal display 201 (step 1003), and the operator responds thereto by inserting the ID card having the authorization to open the IC card storing unit door 205 into the ID card reader 203 (step 1004). When the ID card is inserted, a message requesting the input of the password is displayed on the liquid crystal display 201 (step 1005). When the operator inputs the password from the touch panel 202 (step 1007), the controller 21 compares the input password with the password management data for each ID number in the ID card managed in the electronic money storing apparatus 6 (step 1008), and when the comparison matches, the comparison match is displayed on the liquid crystal 201 and a prompt to open the IC card storing unit door 205 is displayed (step 1009), and the IC card storing unit door 205 is released by using the lock 206 like the electromagnetic lock 215 shown in FIG. 8 (step 1010).

When the password comparison in the step 1008 does not match, a request for reentry is displayed on the liquid crystal display 201 (step 1005), and a predetermined number of times of retry are permitted (step 1006), but when the predetermined number of retry times is exceeded, the operation by that card is no longer permitted to guard the security (step 1011).

Figure 11:
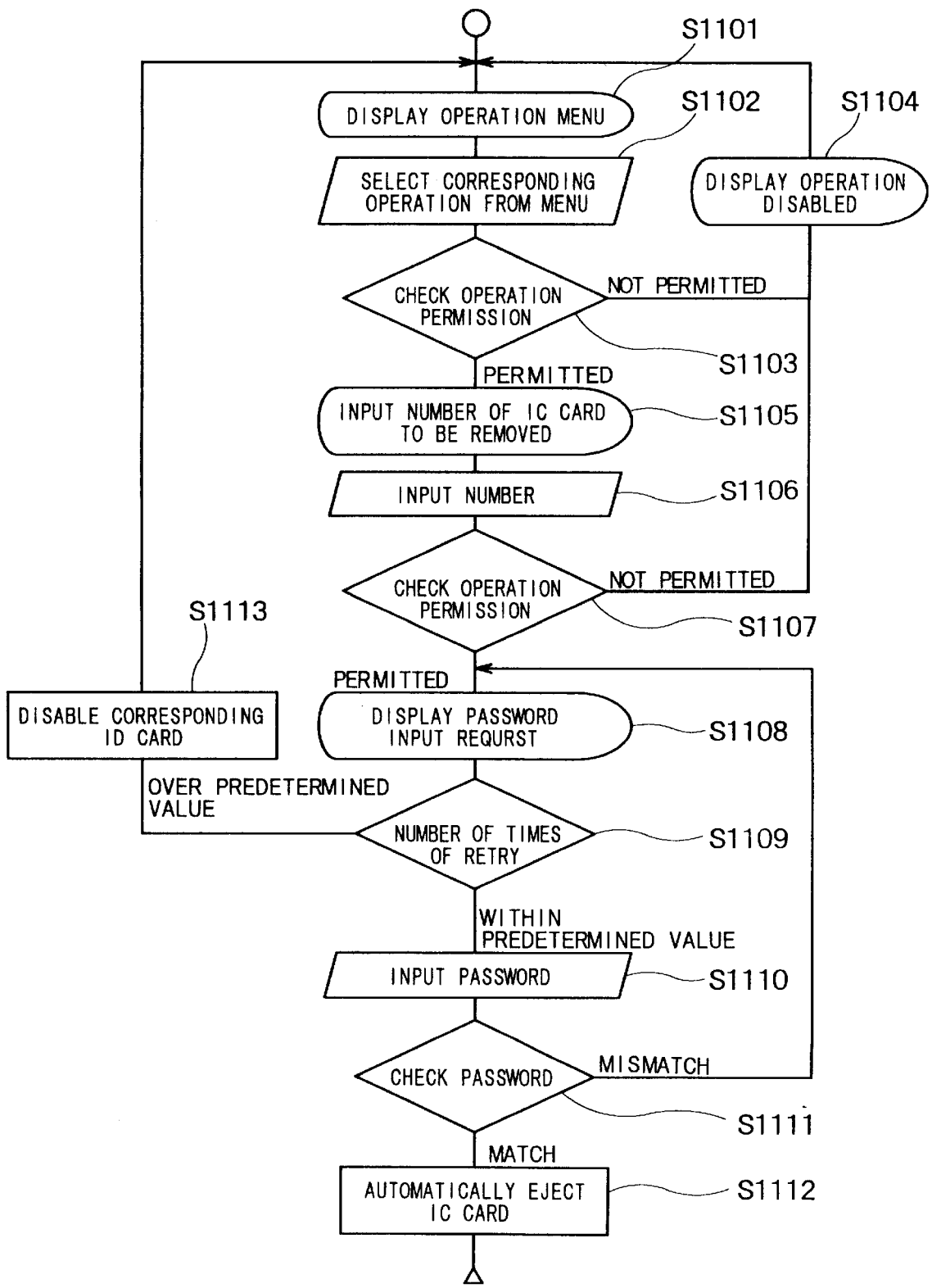
FIG. 11 shows a flow chart of a process when the IC card 16 is taken out of the ICRW 14 shown in FIG. 7.

FIG. 11 shows a flow chart of a process when the IC card 16 set in the ICRW 14 of the IC card storing unit 212 is taken out.

A predetermined operation menu is displayed on the liquid crystal display 201 and the operator selects the IC card removal process from the menu (steps 1101 and 1102). The controller 21 of the electronic money storing apparatus 6 checks whether the IC card storing unit door 205 is open or not (step 1103). If it is not open, operation not permitted is displayed on the liquid crystal display 201 (step 1104) and the process returns to the initial operation menu. If the door is open, a message for prompting the entry of the number of the ICRW 14 in which the taken-out IC card 16 is stored is displayed on the liquid crystal display 201 (step 1105) storing apparatus that the operator inputs the card number by the touch panel 202 (step 1106).

The removal of the IC card 16 is permitted on the condition that the management terminal, not shown, permits the removal operation and the removal of the IC card and the electronic money balance in the taken-out IC card 16 has been moved to other IC card and the balance is zero (step 1107).

If the balance of the IC card 16 is zero and the door is open, a message requesting the entry of the password of the operator ID card is displayed on the liquid crystal display 201 (step 1108) and the operator inputs the password of the operator ID card through the touch panel 202 (step 1110). If the comparison matches (step 1111), the selected IC card is automatically ejected (step 1112). In the password check, if the comparison does not match, a predetermined number of times of reentry of the password is permitted as it is in the process shown in FIG. 10 (step 1109). When the predetermined number of retry times is exceeded, the operation by that IC card is no longer permitted to guard the security (step 1113).

The operator takes out the IC card 16 by using the ID card. The ID card inserted into the ID card reader 203 is automatically ejected from the ID card reader 203 when the operator closes the IC card storing unit door 205 and selects the ID card take-out process from the operation menu displayed on the liquid crystal display 201.

In the present instance, the removal operation of the electronic money card (IC card) is permitted on the condition that the electronic money balance of that card is zero. Alternatively, when the removal IC card is set to the electronic locked state make it unusable thereafter to inhibit the movement of the electronic money data as described above, the removal operation may be permitted on the condition of the locked state.

Figure 12:
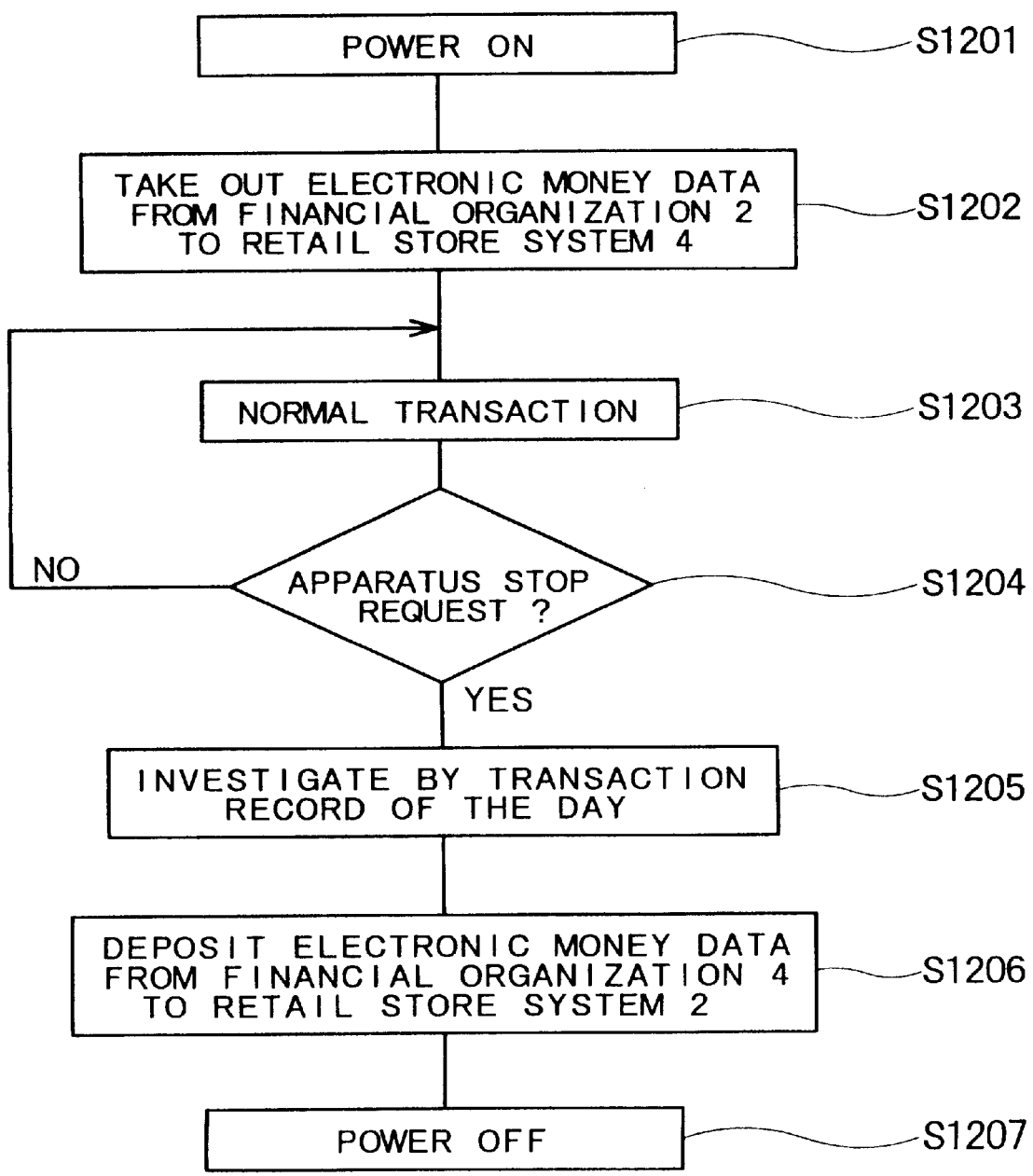
FIG. 12 shows a flow chart of a one-day business operation of the electronic money storing apparatus 6.

FIG. 12 shows a flow chart of one-day business operation from the power-on of the electronic money storing apparatus through the normal transaction to the shut-down of the power. Here, by way of example, an operation of the electronic money storing apparatus 6 in the financial organization 4 of the electronic money system shown in FIG. 1 is explained.

When the electronic money storing apparatus 6 is powered on (step 1201), the initial setting operation shown in FIG. 4 is started and the electronic money data of the amount necessary for the business of that day is taken out from the electronic money storing apparatus 6 of the retail store system 2 to the electronic money storing apparatus 6 in the retail store system (step 1202), and desired normal transactions are thereafter conducted (step 1203).

When the business of that day is over and the electronic money storing apparatus 6 of the retail store system 4 is to be stopped, the controller 21 recognizes a stop request by the operator or a stop request from the external through the network 17 and the line controller 27 (step 1204), and the receipts and the payments of that day are investigated based on the withdrawal amount of that day from the financial organization 2 and the transaction record during the business (step 1205). Thereafter, the electronic money data of the electronic money storing apparatus 6 in the retail store system 4 is deposited to the electronic money storing apparatus 6 in the financial organization 2 (step 1206), and the power is shut down to stop the electronic money storing apparatus 6 (step 1207) to stop the business of the day.

By depositing the electronic money data to the financial organization 2 instead of maintaining the electronic money data in the electronic money storing apparatus 6 in the retail store system 4 during the period other than the business period of the day as it is in the above example of the business operation, the damage of the electronic money data can be protected from the crime by the unauthorized invasion to the retail store system 4 which is likely to occur during the off-business time such as midnight.

As described above, in accordance with the present invention, the electronic money storing apparatus which prevents the electronic money card (IC card) from the human crimes and the disasters and which is of low cost and small space requirement is provided.

What is claimed is:

1. An electronic money storing apparatus for storing a plurality of electronic money cards holding electronic money comprising:

a line controller connected to a communication network for communicating electronic money data, for controlling the communication with the communication network;

card read/write means for accommodating a plurality of electronic money cards and reading and writing data for the cards; and a controller for handling a plurality of transactions in parallel by controlling transmission and reception of the electronic money through said card read/write means and said line controllerm, each transaction being an electronic money transfer between the electronic money cards accommodated in said card read/write means or between an external electronic money card accessed via the communication network and the electronic money card accommodated in said card read/write means, wherein said controller selects at least one from said electronic money cards accommodated in said card read/write means for each transaction and sending a selection request to said card read/write means, and wherein said card read/write means reads and writes the electronic money in the electronic money card in response to the selection request.

2. An electronic money storing apparatus according to claim 1 wherein said electronic money card comprises an IC chip holding the electronic money, and said card read/write means comprises a board having a plurality of IC chips mounted on a substrate for reading and writing data for each of the IC chips.

3. An electronic money storing apparatus according to claim 1 further comprising a memory unit for storing a status of said electronic money cards stored in said electronic money storing apparatus;

said memory unit storing an electronic money balance of each of said electronic money cards.

4. An electronic money storing apparatus according to claim 3 wherein said controller refers the electronic money balance relating to each of the electronic money cards stored in said memory unit to select the electronic money card having the balance in the payment process of the electronic money from the electronic money cards stored in said electronic money storing apparatus, and conducts the payment process from the selected electronic money card.

5. An electronic money storing apparatus according to claim 4 wherein said memory unit further stores management flags for indicating whether the electronic money cards are in the process of transaction or not, said controller refers the electronic money balances relating to the electronic money cards stored in said memory unit to select the electronic money card which is not in the process of transaction and has an electronic money balance, and said electronic money storing apparatus conducts the payment process of the electronic money from the selected electronic money card.

6. An electronic money storing apparatus according to claim 1 further comprising a memory unit for storing states of said electronic money cards stored in said electronic money storing apparatus;
   said memory unit storing management flags for indicating whether the electronic money cards are in the process of transaction or not;
   said controller referring the management flags stored in said memory unit to select the electronic money which is not in the process of transaction; and
   said electronic money storing apparatus conducting a receipt process of the electronic money to the selected electronic money card or a payment process of the electronic money from the electronic money card.

7. An electronic money storing apparatus according to claim 1 further comprising a memory unit for storing electronic money balances of the electronic money cards stored in said electronic money storing apparatus;
   wherein said controller refers the balances of the electronic money cards stored in said memory unit and permits the removal of the electronic money card having no balance from said card read/write means.

8. An electronic money storing apparatus for handling electronic money cards holding electronic money as electronic data having the same value as currency, comprising:
   a card storing unit for storing said electronic money cards;
   an openable and closable card storing unit door for covering said card storing unit;
   a lock for locking said card storing unit door and said card storing unit; and
   a controller for controlling states of said electronic money cards;
   said controller permitting release of said card storing unit door by said lock or removal of said electronic money cards stored in said card storing unit on condition of a predetermined process to said apparatus; and
   further comprising a sensor for detecting a defect to said electronic money storing apparatus,
   wherein when said sensor detects a defect, said controller selectively transmits data of the electronic money cards stored in said card storing unit to other electronic money card in an apparatus other than said electronic money storing apparatus or applies an electronic lock to disable the handling of the data of the electronic money cards stored in said card storing unit.

9. An electronic money storing apparatus according to claim 8 further comprising an input and/or output unit for displaying operation transaction as a guidance and detecting an input, and when the transaction inputted to said input and/or output unit is the removal of the electronic money card from said card storing unit or the opening of said card storing unit door, said controller compares a password inputted from said input and/or output unit with a previously stored password and when the comparison matches, permits the release of said card storing door by said lock or the removal of said electronic money cards stored in said card storing unit.

10. An electronic money storing apparatus according to claim 8 further comprising an ID information input unit for reading information of an ID card provided in said electronic money storing apparatus for handling;
   wherein said controller permits the release of said card storing unit door by said lock or the removal of said electronic money cards stored in said card storing unit on the condition that an input value inputted from said ID information input unit is a predetermined value.

11. An electronic money storing apparatus according to claim 8 further comprising first power supply means for supplying power to said electronic money storing apparatus;
   wherein said controller detects an interruption of the power supply by said first power supply means to terminate the communication of the data of the electronic money cards stored in said card storing unit.

12. An electronic money storing apparatus according to claim 11 further comprising second power supply means for supplying power to said electronic money storing apparatus;
   wherein when said controller detects the interruption of the power supply by said first power supply means, said controller selects said second power supply means, and when said controller detects that a voltage of said second power supply means drops to a predetermined voltage, said controller terminates the communication of the data of said electronic money cards stored in said card storing unit.

13. An electronic money storing apparatus according to claim 8 further comprising an input/output unit for displaying a guidance for guiding the operation of said electronic money storing apparatus and detecting an input for a predetermined operation process;
   wherein when one of the electronic money cards stored in said card storing unit is selected from said input/output unit, said controller receives a selection signal from said input/output unit to determine whether the corresponding electronic money card is in the process of transaction or not.

14. An electronic money storing apparatus according to claim 8 further comprising a power supply for supplying power to said electronic money storing apparatus;
   wherein when said controller receives a request to stop the power from said power supply, said controller transmits the electronic money data of the electronic money cards in said card storing unit to electronic money cards in an apparatus other than said electronic money storing apparatus.

15. In a system comprising an IC reader/writer (ICRW) for accommodating a plurality of IC cards and reading and writing data for the cards, a CPU for handling a plurality of transactions in parallel by controlling transmission and reception of data through the ICRW, and a memory, a control method executed by CPU for controlling data transmission and data reception of the IC cards, comprising the steps of:
   storing a status of the IC cards in the ICRW into the memory:
   receiving an access request for the IC cards;
   referring the status of the IC cards to select one IC card which is not in a reading or writing process by the ICRW; and
   outputting signal to grant the access to the selected IC card.

16. A control method according to claim 15 wherein when the access grant signal is issued by said CPU, said CPU stores movement history of the data of the IC card for which the access was granted into said memory.

17. A control method according to claim 15 wherein said CPU manages the IC card for which the access was granted and sequentially stores the remainder of the data of the IC card into said memory.

18. An electronic money storing apparatus in an electronic money transaction system for transmitting and receiving electronic money between IC cards holding electronic money, comprising:

a plurality of IC card read/write means each having IC cards loaded therein; and control means connected to each of said IC card read/write means for reading and writing electronic money of the IC cards loaded in a selected IC card read/write means and transmitting and receiving electronic money between the selected IC card and the external of said electronic money storing apparatus; and further comprising detection means for detecting phenomena which are factors inducing breakage, malfunction or defect of an electronic equipment including temperature, vibration, shock, electromagnetic waves and water, wherein in response to a signal from said detection means, the electronic money in said electronic money storing apparatus is moved to an electronic string media of other electronic money storing apparatus via a communication line.

19. An electronic money storing apparatus according to claim 18 wherein ejection of said IC cards is permitted on condition that all electronic money in the IC cards of said electronic money storing apparatus have been transferred to other IC cards.

* * * * *